United States Patent [19]

Slinko

[11] E Re. 28,648

[45] Reissued Dec. 9, 1975

[54] PROCESS FOR CARRYING OUT CHEMICAL REACTIONS IN A FLUIDIZED BED

[75] Inventor: Mikhail Gavrilovitch Slinko, Novosibirsk, U.S.S.R.

[73] Assignee: UCB Societe Anonyme, Brussels, Belgium; a part interest

[22] Filed: Aug. 7, 1974

[21] Appl. No.: 495,519

Related U.S. Patent Documents

Reissue of:

[64] Patent No.: 3,784,561
Issued: Jan. 8, 1974
Appl. No.: 216,774
Filed: Jan. 10, 1972

[30] Foreign Application Priority Data

Jan. 12, 1971 United Kingdom ..... 1485/71

[52] U.S. Cl. ..... 260/465.3; 260/346.4; 260/346.7; 260/348.5; 260/533 N; 260/604 R; 260/680; 260/683

[51] Int. Cl.[2] ..... C07C 120/14; C07C 121/02

[58] Field of Search ..... 260/465.3

[56] References Cited

UNITED STATES PATENTS

| | | | |
|---|---|---|---|
| 2,893,851 | 7/1959 | Georgian | 23/288.5 |
| 3,226,422 | 12/1965 | Sennewald et al. | 260/465.3 |
| 3,254,110 | 5/1966 | Sennewald et al. | 260/465.3 |
| 3,472,892 | 10/1969 | Callahan et al. | 260/465.3 |
| 3,501,517 | 3/1970 | Hughes et al. | 260/465.3 X |
| 3,639,103 | 2/1972 | Sheely | 260/465.3 X |

FOREIGN PATENTS OR APPLICATIONS

| | | | |
|---|---|---|---|
| 1,019,235 | 2/1966 | United Kingdom | 23/288.5 |
| 768,836 | 2/1957 | United Kingdom | 23/288.5 |
| 774,325 | 5/1957 | United Kingdom | 23/288.5 |

*Primary Examiner*—Joseph P. Brust
*Attorney, Agent, or Firm*—Wenderoth, Lind & Ponack

[57] ABSTRACT

A process for carrying out chemical reactions by catalytic fluidization, in a reactor containing heat exchange means and filling elements, in which said filling elements used are windings of rigid wire, the volume of material of which represents 2 to 12% of the volume occupied by the catalyst under working conditions, and in which the speed of displacement of the gaseous constituents through the reactor is from 0.25 to 0.95 times the speed of entrainment of the fluidized particles of the catalyst.

9 Claims, No Drawings

PROCESS FOR CARRYING OUT CHEMICAL REACTIONS IN A FLUIDIZED BED

Matter enclosed in heavy brackets [ ] appears in the original patent but forms no part of this reissue specification; matter printed in italics indicates the additions made by reissue.

*This is a reissue application of U.S. Patent No., 3,784,561 which matured from Serial No. 216,774 filed January 10, 1972.*

The present invention is concerned with a process for carrying out chemical reactions in a fluidized bed.

It is known that fluidization technique can be used successfully, particularly in the presence of a catalyst, for carrying out chemical reactions in the heterogeneous gas/solid phase, in which the reagents in the gaseous phase are brought into contact with a fluidized bed of finely-divided solid material, usually possessing catalytic properties. Because of the convenience of fluidization, this tecnhique is widely used in the chemical manufacturing industry and particularly in the petroleum industry.

Nevertheless, great difficulties are sometimes encountered in carrying out this technique when the reactions in question are highly exothermal, because of the delicate problem of correct dissipation of the heat of reaction. It has, in fact, been found that it is often very difficult to keep the temperature within optimum limits, which often constitute a very narrow range, the obtaining of optimum results being conditional upon correct maintenance of temperature. It is for this reason that it has been proposed to incorporate cooling means in the reaction vessel, precisely with the object of promoting dissipation of the heat released by the reaction. This measure is, however, often found to be inadequate because other factors considerably lower the activity and selectivity of the catalyst in relation to theoretical values, theoretical valve being understood to mean not what would be expected from [stiochiometry] *stoichiometry* but, more precisely, what is indicated by kinetic data obtained under ideal conditions free from all the disturbances associated with transfers of heat and mass. This drop in activity and selectivity is caused, amongst other factors, by insufficient exchange of mass between the light and dense phases of the catalytic bed, by the existence of [heterogeneityin] *heterogeneity in* the latter and by the formation and coalescence of gas bubbles of increasing dimensions. Phenomena known, for example, under the names of "by-passing" and "back-mixing" also intervene. "By-passing" is mainly responsible for the drop in activity associated with too rapid a passing of the reagents into the catalysis vessel. In the case of "back-mixing," instead of travelling normally from the inlet to the outlet of the reactor, the products return in the rearward direction and consequently have a longer residence time than was intended, with the corollary of more or less considerable destruction of the reagents and particularly of the reaction products, thus entailing a corresponding loss of selectivity. For this reason, it has been proposed that the fluidized bed should contain grids, lattices, horizontal, vertical or oblique bars or tubes, baffles and other filling elements, such as Raschig rings, Berl saddles or the like. Although these various means improve the results of fluid catalysis, there is still room for improvement.

It is, therefore, an object of the present invention to provide improvements to fluid catalysis processes in the case of chemical reactions.

According to the present invention, a process is provided for carrying out chemical reaction by fluidization, more particularly by catalytic fluidization in a reactor containing heat exchange means and filling elements, characterized in that the filling elements used are windings of rigid wire, the volume of material of which represents from 2 to 12%, preferably 3 to 10% of the volume occupied by the catalyst under working conditions, and in that the speed of displacement of the gaseous constituents through the reactor is from 0.25 to 0.95, preferably 0.40 to 0.90, times the speed of entrainment of the fluidized particles of the catalyst.

The rigid wire windings used in accordance with the present invention are composed of a material which is inert or catalytically active in relation to the gaseous reagents. It must be of a material selected to withstand both the erosion caused by the fluidized catalyst particles and the reaction conditions, for example, temperature and pressure. Therefore, in each particular case the nature of the material must be adapted to the particular reaction and also to the condition under which the reaction is carried out; by way of example, there may be used glass, ceramic materials and inert or catalytically active metals and metal alloys.

In contradistinction to the fine wire lattices previously used as filling elements, the windings used according to the present invention are composed of a rigid wire, for example of a diameter of at least 0.4 mm. so that the windings do not undergo substantial deformation when stacked up in the reactor.

The windings used according to the present invention have their turns separated from one another by a distance which is at least 20 times the dimension of the fluidized catalyst particles, so as to permit free passage of the catalyst particles between the turns of the windings. On the other hand, for a reactor of given dimensions, the dimensions of the windings, i.e. diameter and length, should be such that at least two windings can be placed end to end over the minimum distance separating the walls of the heat exchange means. In addition, the shape of the windings must be such that interpenetration is negligible or even impossible. The turns of the windings may be, for example, circular, oval or polygonal.

The fluidized catalyst used in the process according to the present invention may have the particle dimensions conventionally used in fluid catalysis. In order to obtain optimum results; the granulometry limits of the catalyst particles should be as narrow as possible.

The heat exchange means may be constituted conventionally by tubes or bundles of tubes through which a liquid or gaseous heat exchange fluid passes. Their number and spatial arrangement depend upon the exothermicity or endothermicity of the reaction in question.

The windings used according to the present invention may be stacked regularly or irregularly in the zone of the reactor reserved for the catalyst under working conditions, the only requirement being that the volume of material of the windings should constitute from 2 to 12%, preferably from 3 to 10%, of the volume of the catalyst under working conditions, as has already been indicated above.

In order that the effective heat exchange coefficient of the masses may be high, the fluidization of the catalyst [particules] *particles* in the reactor containing the windings used according to the present invention should be effected by imparting to the gaseous constit- ıents a speed of displacement of from 0.25 to 0.95 imes, preferably of from 0.4 to 0.9 times, the speed of :ntrainment of the fluidized particles of catalyst.

The measures proposed according to the present in-'ention considerably reduce "back-mixing," while not educing axial and radial heat exchange between the luidized catalyst particles and the walls of the heat ex-:hange means. Furthermore, the homogeneity of the luidized bed is greatly improved and gas circulation urbulence in the reactor is substantially reduced.

The process of the present invention can be used on .n industrial scale. The advantages which it provides ncludes not only an improvement of the conversion of he reagents used for the reaction and the efficiency in espect of the desired reaction [ products ] *product* ıut also an increase of the production rate of the reac-ɔr because of the high linear gas speeds which are pos-ible in the latter. Furthermore, starting with an experi-ıental reactor, with the windings according to the ıresent invention it is easier to calculate the parame-ers for a reactor operating on a pilot or industrial cale, which is difficult to do with techniques known at ıresent.

The following examples of the process of the present ıvention relate to the synthesis of acrylonitrile from ropylene and ammonia. It is, however, to be under-tood that the process of the present invention has a ·ider scope and is applicable, in principle, to all chemi-al reactions which can be carried out in the fluidized ed, for example, the catalytic oxidation of naphtha-:ne to phthalic anhydride; of benzene to maleic anhy-ride; of ethylene and propylene to the corresponding xides; of ethylene and propylene to acrolein and ıethacrolein, respectively, or to arylic or methacrylic cid, respectively; and of isobutene, together with am-ıonia, to methacrylonitrile, etc.; the catalytic dehydro-enation of saturated hydrocarbons into olefins or olyolefins; and the production of chlorine by oxida-on of hydrochloric acid etc.

The catalyst fluidization reactor used for the tests de-:ribed in Examples 1 and 2 is made of stainless steel ıeeting with a thickness of 3 mm. It comprises 3 suc-essive cylindrical parts, all of which have a diameter of 00 mm. and heights of 1 m., 1 m. and 1.5 m., respec-vely (from bottom to top).

In each of the two lower sections, cooling is effected y an axial cooler comprising an outer casing (having a iameter of 40 mm./44 mm. in the bottom section and 2 mm./48 mm. in the middle section) and an inner entral passage comprising a tube with a diameter of 6 ım./10 mm., all these parts being made of stainless eel. Each cooling tube has a length of 1 m. and is sup-ied with distilled water by means of a metering pump. he gases are distributed through a sintered stainless eel plate at the base of the reactor.

The gases are freed from dust by means of an exter-ıl cyclone fitted to the top section, the particles of ıtalyst collected being recycled through a stand-pipe the bottom section, below the sintered distributor.

The feed mixture consists of a gaseous mixture of 'opylene, ammonia and water, together with air sup-ied by a compressor.

The isolation of the reaction products is effected by ɔnventional cooling tecnhiques, neutralization with lfuric acid and absorption of the neutral gas in water.

The catalyst is prepared in accordance with Example ɔ. 6 of Belgian patent specification No. 622,025. This ıtalyst is obtained by precipitation with ammonia of iron and antimony salts, the Sb/Fe atomic ratio being 1.67/1. The catalyst has a particle size of between 40 and 150 microns.

EXAMPLE 1

In the reactor described above, four tests were carried out:

(a) without filling elements;

(b) with a baffles, each of which is made of a stainless steel plate with a thickness of 1 mm., perforated mechanically with staggered apertures with a diameter of 3 mm. These baffles are strung on the cooling tubes and fixed by spotwelding. Their spacing varies in [depence] *dependence* upon their number;

(c) with windings according to the present invention, made of stainless steel wire with a calibre of 2 mm., wound in turns with a diameter of 40 mm., and with a spacing of 10 mm. between turns, the length of each winding being 70 mm. These windings are stacked randomly in the raector, the height of the stack being 175 cm.;

(d) with a mixed system comprising the use of windings of type (c) disposed between baffles of type (b).

89 litres of the antimony-iron catalyst described above is introduced in order to obtain a residence time of 4 seconds for a total flow per hour of 80 m.$^3$ (N.T.P.) of the gaseous reagents. Under these conditions, the linear speed of this mixture is 31.4 cm./sec. The speed of entrainment of the catalyst is about 70 cm./sec. for the particle size used. The gas mixture fed to the reactor contains the following proportions of components, expressed in percent by volume: [$C_3H_6$:Nn$_3$:$H_2O$:air=6:7:10:77.] *$C_3H_6$:$NH_3$:$H_2O$:air=6:7:10:77.* The volume of the material of the windings constitutes 3.5% of the volume of the catalyst under working conditions.

The temperature in the catalytic bed is, in each case, 450° C.

The following table shows the influence exerted by the different filling systems on the results obtained:

TABLE

| | Tests | Eff. AN | Conv. $C_3H_6$ | Productivity |
|---|---|---|---|---|
| (a) | Bed without fillings | 40 | 60 | 51 |
| (b) | 7 baffles | 50 | 79 | 64 |
| | 10 baffles | 53 | 80 | 68 |
| | 16 baffles | 54 | 88 | 69 |
| (c) | Windings | 60 | 93 | 76.5 |
| (d) | 5 baffles plus windings | 57 | 86 | 73 |

NOTES:

$$\text{Eff. AN} = \frac{\text{moles of acrylonitrile obtained}}{\text{moles of propene introduced}} \times 100$$

$$\text{Conv. } C_3H_6 = \frac{\text{moles of propene converted}}{\text{moles of propene introduced}} \times 100$$

Productivity=grammes of acrylonitrile produced per hour per litre of catalyst.

The above table shows that, with the windings used according to the present invention (test c), best results are obtained than those obtained without windings (test a), by means of baffles (test b) or by a combination of baffles and windings (test d).

EXAMPLE 2

With a charge of 56.5 litres of catalyst, a total flow of 90 m.$^3$ (N.T.P.) per hour (residence time 2.26 sec., linear speed 35.4 cm./sec.), a volume of winding material constituting 5.6% of the volume of catalyst under working conditions and using a gaseous mixture comprising as percent by volume, [$C_3H_6H_2O$:air=6:7.5:10:76.5, ] *$C_3H_6$:$NH_3$:$H_2O$:air=6:7.5:10:76.5,* the other conditions being those maintained in Example 1, the following results are obtained at 455° C.: 6

| | | |
|---|---|---|
| Eff. AN | percent | 65 |
| Conv. $C_3H_6$ | do. | 95 |
| Productivity: 146 | | |

This example shows that, by means of the process according to the present invention, it is possible for the residence time to be substantially reduced, thus making it possible to increase production considerably, while obtaining still better efficiency and conversion.

I claim:

1. In a catalytic fluid-bed process for the preparation of acrylonitrile wherein a gaseous mixture comprising propylene, ammonia and oxygen are passed through a reaction zone comprising fluidized catalyst particles and filling elements, the improvement wherein the filling elements consist of a plurality of windings of rigid material which is inert or catalytically active in relation to the gaseous reactants, the volume of which represents 2 to 12% of the volume occupied by the catalyst particles under the working conditions and the speed of displacement of the gaseous reactants through the reaction zone is from 0.25 to 0.95 times the speed of entrainment of the fluidized catalyst particles.

2. A process according to claim 1, in which the volume of material of the windings represents 3 to 10% of the volume occupied by the catalyst under working conditions.

3. A process according to claim 1, in which the speed of displacement of the gaseous constituents through the reaction zone is 0.40 to 0.90 times the speed of entrainment of the fluidized particles of the catalyst.

4. A process according to claim 1, in which the diameter of the material of the windings is at least 0.4 mm.

5. A process according to claim 1, in which the turns of the windings are separated from one another by a distance which is at least 20 times the dimension of the fluidized catalyst particles.

6. A process according to claim 1, in which the diameter and length of the windings are such that at least two windings can be placed end to end over the minimum distance.

7. A process according to claim 1, in which the shape of the windings is such that interpenetration is negligible.

8. A process according to claim 1, in which the shape of the turns of the windings is circular, oval or polygonal.

9. A process according to claim 1 wherein the filling elements consist of a plurality of windings of rigid wire.

* * * * *